US006538640B1

United States Patent
Ostrum et al.

(10) Patent No.: US 6,538,640 B1
(45) Date of Patent: Mar. 25, 2003

(54) SKIPPED-STATE METHOD FOR MOUSE ENCODING

(75) Inventors: Brett T. Ostrum, Edmonds, WA (US); Gary Rensberger, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 230 days.

(21) Appl. No.: 09/652,389

(22) Filed: Aug. 31, 2000

Related U.S. Application Data (60) Provisional application No. 60/198,517, filed on Apr. 19, 2000.

(51) Int. Cl.[7] .................................................. G09G 5/08
(52) U.S. Cl. ....................................... 345/163; 345/167
(58) Field of Search ................................. 345/163, 164, 345/165, 156, 166, 167, 161, 162; 74/471; 463/30, 37, 38, 36

(56) References Cited

U.S. PATENT DOCUMENTS

| | | | |
|---|---|---|---|
| 5,256,913 A | 10/1993 | Sommer | 307/311 |
| 5,557,440 A | * 9/1996 | Hanson et al. | 250/214 R |
| 5,748,181 A | * 5/1998 | Fu et al. | 250/231.12 |
| 5,748,494 A | * 5/1998 | Ko | 178/18.11 |
| 6,252,584 B1 | * 6/2001 | Wu | 345/166 |
| 6,380,927 B1 | * 4/2002 | Ostrum et al. | 345/165 |

* cited by examiner

Primary Examiner—Chanh Nguyen
(74) Attorney, Agent, or Firm—Microsoft Corporation (57) ABSTRACT

A process for encoding the movement of a computer pointing device to better control a cursor or other object on a display. The process makes use of two assumptions relating to illegal transitions (skipped states) that enables information relating to such illegal transitions to be included in the encoding process that samples states of a waveform produced by a detector in the pointing device. The first assumption refers to the directional ambiguity of a skipped state. When examined logically, it can be determined that this directional ambiguity need not be a concern, because a pointing device moving fast enough so that states are missed is realistically unable to reverse direction so fast that subsequent samples of the waveform would miss the reversal. Therefore, if a state is skipped, it is a reasonable assumption to assign the direction to the skipped state determined from the preceding samples. The second assumption is that if each single state transition represents one unit of movement and sampling times are frequent enough such that it is unlikely that two adjacent states will be missed in the sampling, each illegal transition represents only a single missed state. Based on these assumptions, a lookup table that describes all possible state changes is incorporated into the encoding process, such that all sample data are combined with the prior directional and state data to determine a movement command output from the pointing device.

38 Claims, 5 Drawing Sheets

SKIPPED-STATE METHOD FOR MOUSE ENCODING

RELATED APPLICATIONS

This application is based on prior copending U.S. provisional patent application Serial No. 60/198,517, filed Apr. 19, 2000, the benefit of the filing date of which is hereby claimed under 35 U.S.C. § 119(e).

FIELD OF THE INVENTION

The present invention generally relates to a computer pointing devices, and more specifically, to encoding a signal produced by a computer pointing device.

BACKGROUND OF THE INVENTION

Computer pointing devices are well known in the art, and have been quite popular with computer users since their introduction. A computer user manipulates a pointing device to change the position of a cursor or other object on a computer display, or to select objects on the display, including letters, one or more words, controls, etc. The physical movement of the pointing device results in a similar movement of the cursor and/or object on the display. One of the most widely used computer pointing devices, which is commonly referred to as a "mouse," typically includes a ball rotatably disposed in a cavity formed on an undersurface of the mouse. The ball rotates as the mouse is moved across a flat surface, often over a pad, and an encoded signal is produced in response to the movement of the mouse.

A conventional ball-based pointing device includes a pair of encoder shafts in the housing that are frictionally driven by the ball as it rolls over a surface. The encoder shafts rotate about a pair of orthogonal axes, i.e., the "X" and "Y" axes, in response to components of the ball's rotation along those axes. At one end, each encoder shaft terminates in a serrated disc. As the encoder shafts rotate, these serrated discs periodically interrupt a light beam traveling from a light emitting diode (LED) source to a photo detector, generating a nominal square-wave signal at the output of the detector. The signals produced by the detector indicate the device's incremental motion along the orthogonal axes and are processed by a micro-controller or other logical processor in the pointing device, which produces a corresponding stream of digital values indicative of a position of the pointing device relative to the X and Y axes. The digital values indicative of the displacement of the pointing device relative to these two axes are passed to a driver program executing on the computer to which the pointing device is attached. The relative position data are processed by the computer, causing a cursor or other object displayed on a monitor to move in response to a user's movement of the mouse. Thus, the X and/or Y movement of the cursor on the display screen is a function of the rotational motion of the ball within the pointing device relative to the X and/or Y axes.

The frequency of each square wave is a measure of the X and Y components of the velocity of the mouse, but this frequency only indicates the speed of movement along one of the axes and does not indicate the direction (left/right, up/down) of the mouse motion. To determine directional information, a second photo detector is disposed near each disk such that its waveform is displaced 90 degrees in phase with respect to the first detector's waveform. By sampling the two X waveforms, a microprocessor can infer both the speed and the direction of the X component. The speed and direction of the Y component are determined in the same manner.

The waveform for one axis represents a series of transitional states. It is the sequence of these transitional states that indicates the direction of travel. For every state change, a new movement command is issued by the microprocessor. Normally, when a user manipulates a computer pointing device at a modest speed, the frequency at which the microprocessor samples or "looks at" the waveforms is sufficient to detect every transitional state of the waveform. However, as the mouse moves faster, the frequency of the square waves increases, effectively reducing the number of samples taken by the microprocessor. If the mouse speed is sufficiently great that a transitional state is not sampled, then the processor sees an illegal transition between non-adjacent states. Traditionally, when an illegal transition has occurred in prior art encoders, no movement command is issued for the illegal transition. Lack of movement commands for such illegal transitions can cause the mouse-controlled motion of a cursor on a computer screen to appear to falter. The traditional rationale for ignoring illegal transitions is that such transitions are directionally ambiguous, i.e., a two-state jump could mean a movement in either of the two possible directions (left/right, or up/down).

However, a conventional mouse encoder actually misses more states than can be accounted for by an excessive rate of mouse movement. The theoretical symmetrical rectangular idealized waveforms are rarely ever attained from the optical sensors. There are several causes for this problem. First, the vanes on the serrated disks used in the encoder are not zero-size objects. Although the vanes on the serrated disks are sharply defined, their finite size causes the light reaching the photo detectors, and hence their response, to increase and decrease gradually, rather than instantaneously. Also, the response speed of the LED detector pairs is not instantaneous, and that response speed is a function of the sensitivity or gain of the LED detector. A third reason that the actual waveforms vary from a theoretical ideal relates to the one/zero decision threshold of the processor in response to the signal input from the encoder, which is seldom one-half of the peak signal magnitude. A final cause is that physical constraints mean the ideal 90 degree placement of the photo detector pairs for each encoder disk is in reality not exactly 90 degrees, being subject to achievable mechanical tolerances.

Due to the first and second causes described above, the rise and fall times of the detector waveforms are finite. Because of the third cause noted above, the waveforms will be sampled at other than one-half of their peak values, which means that the one/zero decision threshold for the processor depends on both the sensitivity of the LED/photo detector combination and the actual threshold voltage of the processor input. Both of these factors can vary considerably over a production batch. The result is that the duty cycle of the waveforms will vary from the ideal value of 50%. Finally, the imperfect mechanical positioning of the pairs of photo detector pairs for each encoder disk means that the dual waveforms that they produce will not actually exhibit the expected ideal 90 degree phase relation.

These effects combine to cause the different transitional states to have different widths (that is, different time durations), which causes the missed-state/illegal transition effect described above to begin occurring at slower mouse speeds than might otherwise be expected. Clearly, states whose durations are shorter than the sampling interval will not always be seen. For instance, a state whose duration is equal to one half the sampling interval will not be detected about half the time (assuming the state period and the sample period are incommensurate, as is normally the case).

It would be desirable to extract useful information from illegal state transitions, and to use that information to improve the performance of a computer pointing device, rather than completely ignoring these illegal state transitions as is taught by the prior art. Contrary to the current view, the directional ambiguity of a skipped state should not be a concern, because when a pointing device is being moved at a sufficiently high speed to cause illegal state transitions, it is very unlikely that the direction of movement of the pointing device can be reversed rapidly enough to cause an error in determining the direction of movement. To underscore the improbability of such rapid reversal in direction of mouse movement, note that a typical sampling interval is 200 microseconds, and skipped states might start occurring at speeds over 5 inches/second. To reverse the direction of a mouse in a time period of less than 400 microseconds (i.e., 2 sample intervals) would require the mouse to decelerate and then accelerate in the opposite direction at over 25,000 inches/second$^2$. Realistically, to reverse direction, a mouse will have to slow down over many sampling intervals, and it is unlikely that a state change corresponding to the reversal in direction will not be sampled.

It would also be desirable to assign a value to the number of states skipped in an illegal transition. For example, in a waveform that is characterized by four states per cycle, if the last known transition state corresponds to State 1, and the next known transition state subsequent to an illegal transition is State 3, then logically, the number of states skipped during the illegal transition can only be one. Thus, without knowing the actual shape of the missing section of the waveform, some information about that portion of the waveform can be deduced.

Accordingly, it would be desirable to develop a method of encoding the movement of a mouse, which instead of ignoring illegal transitions, assumes that the direction corresponding to the skipped state is consistent with the last identified direction. This method should also include information relating to the number of states skipped during an illegal transition. The prior art does not teach or suggest such a method.

SUMMARY OF THE INVENTION

A first aspect of the present invention is directed to a method for use with a pointing device having a plurality of detectors that produce signals, which change state to indicate movement of the pointing device relative to each of two orthogonal axes. The method detects movement of the pointing device relative to each of the two orthogonal axes even when changes in state have been skipped. Changes in the state of the signals are monitored, producing a movement value for the pointing device corresponding to the change in the state of the signals. The method detects when a change in the state of the signals has been skipped. When a skipped state occurs, a compensating movement value for the pointing device corresponding to an expected change in state of the signals is produced.

The step of producing the compensating movement value includes the step of assigning a direction to the compensating movement value identical to that of a movement value that was just determined. The compensating movement value is twice the movement value produced when a change in state has not been skipped.

Preferably, to produce the movement value and the compensated movement value, a lookup table is accessed. Movement values and compensated movement values for each orthogonal axis are accumulated for a predefined interval, to produce an output signal. In one form of the invention, the output signal is supplied from the pointing device to a host computer for use in controlling an object on a display in response to movement of the pointing device. In another form of the invention, the movement value and the compensated movement value are each determined by a host computer.

The step of detecting when a change in the state of the signals has been skipped preferably comprises the steps of defining an expected order in which the states being monitored should change. The skipped state is then detected when the states being monitored have not changed in the expected order.

Another aspect of the present invention is directed to a computer-accessible memory media on which are stored computer-executable machine instructions. When executed by a computer, the machine instructions generally cause the steps of the above method to be carried out.

Yet another aspect of the present invention is directed to apparatus for controlling an object on a display. The apparatus includes an element mounted so as to be movable by a user relative to each of two orthogonal axes. A plurality of detectors are positioned to sense movement of the element, producing a plurality of pairs of signals. Each pair of signals has a phase relationship that defines changes in state indicative of the movement of the element relative to a different one of the two orthogonal axes. A conditioning circuit is coupled to the plurality of detectors to sample the plurality of pairs of signals. The conditioning circuit produces a digital signal corresponding to samples of the plurality of pairs of signals for each axis. A memory is provided in which machine instructions are stored, and a processor is coupled to the memory, and to the conditioning circuit to receive the digital signal. The processor executes the machine instructions to carry out functions generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention is directed to a method for improving the performance of computer pointing devices that incorporate a conventional ball motion tracking system. The method makes use of data relating to illegal transitions for encoding the signal that represents the user's physical manipulation of the pointing device for use by a computer. In the prior art, all data relating to illegal transitions have been ignored, often resulting in erratic cursor movement due to an interruption in the data controlling the cursor position on a display. While the present invention is not limited to use with a mouse, but instead, is intended to be applicable to other types of pointing devices, to simplify the following discussion, the pointing device to which the present invention is applied in the exemplary application of the present invention will simply be referred to as a "mouse," but that term of reference is not intended to be limiting on the scope of the present invention.

As noted above, prior art conventional pointing devices convert planar motion into a revolving motion, using two serrated disks, one each for the X and Y components of the planar motion. Each serrated disk periodically interrupts a light beam travelling from an LED source to a photo detector, generating a nominal square-wave signal in the output of the detector. The frequency of each square wave relates to the velocity of the mouse along one axis. To determine a direction (left/right, up/down) of the mouse motion, a second waveform that is about 90 degrees displaced in phase with respect to a first waveform (generated by a first photo detector) is generated by a suitably located second photo detector. By sampling these two X waveforms, a microprocessor can infer both the speed and the direction of the X component. The Y component is similarly determined. As noted in the Background of the Invention, for a number of reasons, such a detection circuit is imperfect, and the square wave signal can be expected to be similarly imperfect. Gaps occurring in the square wave signal are referred to as skipped states, and the present invention provides a method for improving the encoding of movement commands related to the original motion that was the source of the square wave signal, by inferring movement information related to the skipped states.

While a preferred embodiment of the invention is used in conjunction with a mouse that tracks movement about both "X" and "Y" axes, it should be understood that the skipped state encoding method of the present invention can also be used in conjunction with pointing devices that track motion along a single axis as well. For example, joysticks are known that include a scroll wheel, and the motion of such a scroll wheel involves motion relative to only a single axis. Additionally, pointing devices sometimes include a "Z" axis scroll wheel, whose motion is only about a single axis. The present invention can be used to encode the movement of a scroll wheel, such that the encoding includes information relative to skipped states of a single axial rotational component. A "Z" axis scroll wheel is described in commonly assigned co-pending U.S. patent application, Ser. No. 09/442,592, entitled, "DETERMINING THE POSITION OF A DETENTED OPTICAL ENCODER," which was filed on Nov. 17,1999, the specification and drawings of which are hereby specifically incorporated herein by reference.

Note also that some pointing devices replace the traditional ball with optical elements, but still track pointer movement relative to a pair of orthogonal axes, i.e., the "X" and "Y" axes, producing a square wave form like that noted above. The skipped state method of the present invention can be beneficially employed to encode movement information for such optical pointing devices as well. Thus, it should be recognized that the application of the skipped state method of the present invention to a traditional ball-based mouse is simply exemplary, and is not intended to be limiting on the scope of the present invention.

Figure 1:
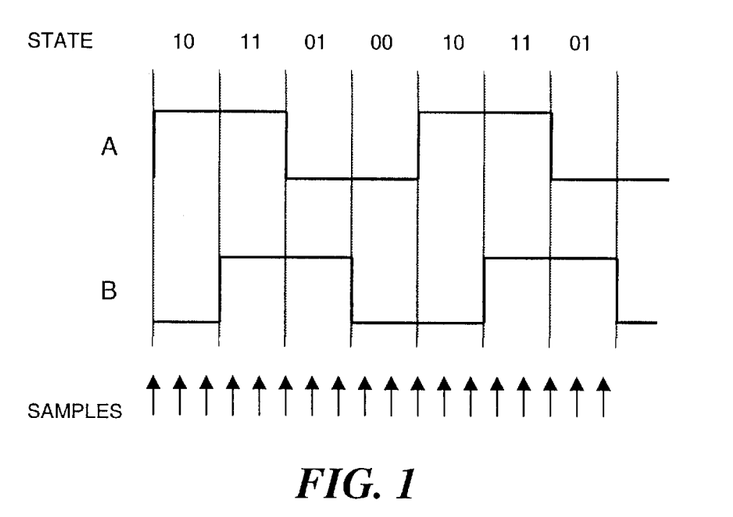
FIG. 1 illustrates two theoretically idealized waveforms generated in response to the planar movement of a mouse along either an X or Y axis, with arrows indicating the times at which the waveforms are sampled.

FIG. 1 illustrates two such theoretically idealized waveforms for one component (either X or Y), together with arrows indicating times at which the microprocessor samples or "looks at" the waveforms. The first waveforms is labeled A, and the second waveform is labeled B. Note that a single cycle of each illustrated waveform includes four transitional states. It is the sequence of these states that indicate the direction of travel. The microprocessor determines the sequence and preferably issues a unit movement command for each state change in the direction that has been identified, i.e., up/down, or left/right.

In the example illustrated, the microprocessor samples the waveforms about three times per state, and thus each state is "seen" more than once. However, as the mouse moves faster, the frequency of the square waves will increase, effectively reducing the number of samples per state. At least four samples per cycle will be required for each state to be seen by the processor. If the processor does not see a state, then an illegal transition between non-adjacent states has occurred. For example, if the processor sees state A10, and the next state the processor sees is A01, then an illegal transition has occurred, as state A11 was not seen by the processor. Traditionally, when this condition has occurred in the prior art, no movement command was issued for the motion associated with state A11.

Also as noted above, in reality, states begin to be missed at mouse movement speeds slower than those at which the waveform frequency exceeds one-fourth the sampling frequency. The missed states occur because the symmetrical rectangular idealized waveforms shown in FIG. 1 are not realistically achievable, for the reasons explained above.

Figure 2:
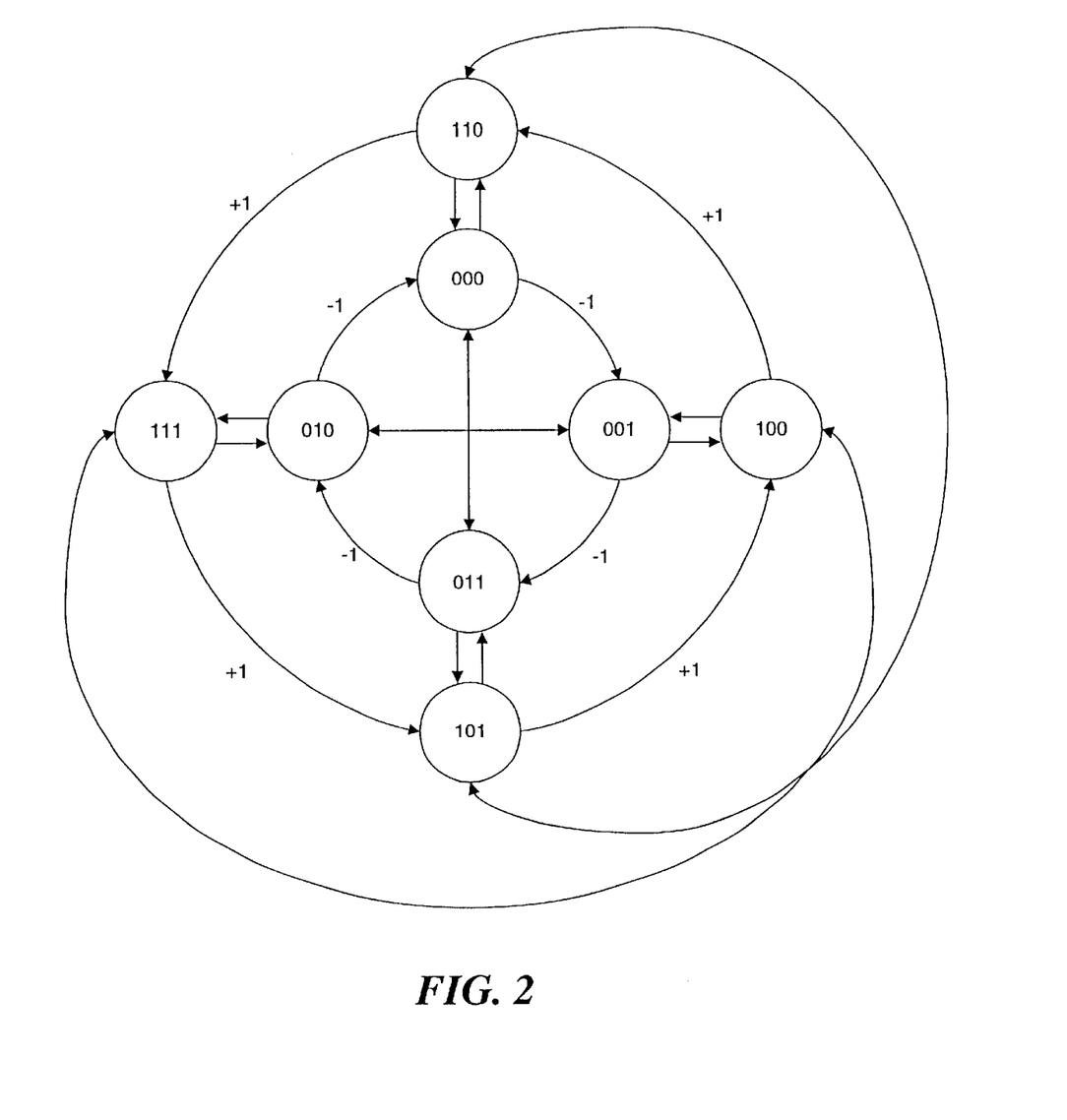
FIG. 2 schematically illustrates a state diagram showing all possible one and two state transitions available to the idealized waveforms of FIG. 1.

FIG. 2 illustrates a state diagram that represents the two degrees of planar motion available to a mouse. All of the possible one and two state transitions are included. The two concentric circles represent the two directions of motion, clockwise (CW) and counterclockwise (CCW). CW motion corresponds to motion of the mouse to the left for the X axis, while CCW corresponds to motion to the right for that axis. Likewise, CW motion corresponds to motion up for the Y axis, while CCW corresponds to motion down for the Y axis. The state numbers (000, 001, etc.) now include the direction, represented by the leftmost bit. For instance, if representing the sequence for movement of the mouse in the X direction, the inner circle would thus be for motion to the left, and the outer circle for motion to the right. Note that each of the four possible states in FIG. 1 (00, 01, 10, and 11) are represented once on the inner circle, and once on the outer circle. The inner circle represents one possible direction, and the outer circle represents the second possible direction. For example, state "00" is represented on the inner circle as "000" and on the outer circle as "100." The additional leftmost bit (0) in "000" indicates that the direction of motion that is associated with state "00" is to the left if state "00" describes motion on the X axis. Similarly, the additional leftmost bit (1) in "100" indicates that the direction of motion that is associated with state "00" is to the right if state "00" describes motion in the X axis. The same scheme is applicable for representing motion along the Y axis, where the leftmost bit (0) indicates motion up, while the leftmost bit (1) indicates motion down, for the mouse.

Numbers on the circular segments indicate the move command that is issued (+1 step or −1 step), where the minus sign corresponds to motion left for the X axis or motion up for the Y axis, and conversely, for the plus sign. Reversal of motion is shown by the bi-directional lines between adjacent states on different circles. For example, as discussed above, state "000" indicates that the direction of motion associated with state "00" is to the left. Referring to FIG. 1, the state adjacent to state "00" in the right-hand direction, indicating a reversal in direction, is state "10." Because the direction is reversed, the leftmost bit changes from "0" in "000" to "1." Combining "1" as the leftmost bit with "10" results in "110." Referring to FIG. 2, states "000" and "110" are adjacent but on different circles (the inner and outer circle) and are connected with bi-directional lines.

In the prior art, no move commands are generated for transitions represented by the bi-directional lines, because those transitions indicate a change in direction. If a movement command were to be provided, the user would likely notice a flickering in the cursor displayed on the screen, representing the change in direction. Such flickering is distracting, which is why no movement commands are generated for transitions across bidirectional lines. The prior art also does not generate move commands for the illegal transitions between states 011/000, 010/001, 111/100, and 101/110. No move commands for these illegal transitions means that the pointing device controlled motion on the computer screen may appear to falter when the speed (and other factors noted above) causes some states to be missed. Traditionally, these illegal transitions cause no move commands to be issued because, as can be seen by inspecting FIG. 2, such a transition is directionally ambiguous, i.e., a two state jump could indicate either a clockwise or a counterclockwise direction in the state diagram.

In order to infer information about the skipped-states, so that reasonable movement commands can be issued for skipped states transitions (011/000, 010/001, 111/100, and 101/110, as shown in FIG. 2), the present invention incorporates several reasonable assumptions so that information about illegal state transitions can be used to encode pointing device movement commands in the output signal from the pointing device. The first assumption relates to the directional ambiguity of a skipped state. When examined logically, it can be determined that this directional ambiguity need not be a concern, because a mouse moving fast enough so that states are missed by the microprocessor sampling the signal waveforms produced by the photo detectors in the mouse will realistically be unable to reverse direction so rapidly that subsequent sampling periods would miss the reversal. In other words, to reverse direction, a pointing device will have to slow down over many sampling intervals, and thus, it will be unlikely that a state associated with a reversal in direction would be skipped. Therefore, if a state is skipped, it is a reasonable assumption to assign a direction to the skipped state that is the direction determined for the immediately preceding state.

The second assumption is that if each single state transition represents one unit of movement, and the sampling times are frequent enough such that it is unlikely two adjacent states will be missed in the sampling, then each illegal transition represents only a single missed state. Referring to FIG. 1, if the prior known state is "00," and the direction is to the right, logically, the skipped state could only be "10."

Using these assumptions, and the representation of all the possible state changes as described in FIG. 2, a lookup table can be developed that can be incorporated into the encoding process. TABLE 1, included below, is an example of such a lookup table. This table lists all possible states, transitions, and actions to be taken. Note that TABLE 1 includes the assignment of double movement commands for skipped-state transitions, the so called illegal transitions. TABLE 1 includes 32 entries, because each of the eight states in FIG. 2 (000, 001, 011, 010, 100, 101, 110, and 111) has four possible transitions: itself (i.e., no movement), the adjacent state in the same direction, the adjacent state in the opposite direction, and two states distant in the same direction (the so-called illegal transition). Note that based on the assumption that illegal transitions must be in the same direction, there is no representation in TABLE 1 of a two state distant transition in the opposite direction. Also note that the four state cycle described in FIG. 1 must be described using the eight states in FIG. 2, i.e., to describe each of the four states associated with movement in each of two directions. In TABLE 1, CW and CCW refer to the corresponding transition directions in the circles of FIG. 2, which are represented by −1 and +1, respectively, the left bit in the state identifier. Note that states associated with a reversal of direction (see State Numbers 2, 8, 9, 15, 19, 21, 27 and 30 from the leftmost column of TABLE 1) are not associated with any movement, for the reasons described above.

Figure 3:
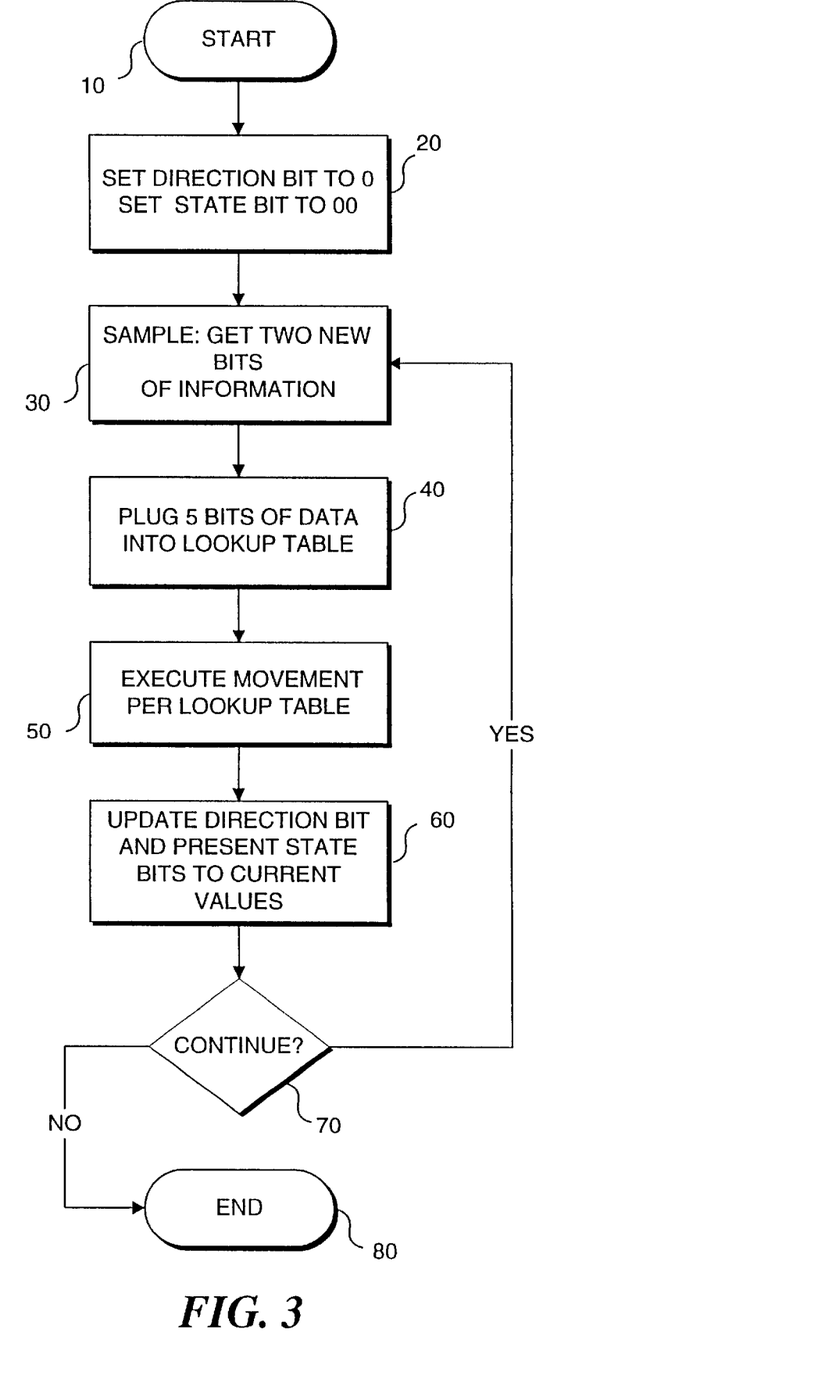
FIG. 3 is a flow chart illustrating the logic the invention uses for including data from illegal transitions into an encoded pointer device movement signal.

Having generated TABLE 1, it is preferably implemented by the microprocessor controlling the encoding process by inserting the table into the code (machine language instructions) executed by the microprocessor. FIG. 3 illustrates the sequence of logical steps used to implement control of the encoder with this lookup table.

The process is initiated at a start block 10. Start block 10 occurs when a user first energizes a computer, or launches a program that uses a mouse. The logic proceeds to a block 20, in which the logic sets a directional bit value to "0" and a state bit value to "00." Thus, the logic always presumes a start from "000." The logic then proceeds to a block 30, where the microprocessor samples the state of the waveform cycle as described in association with FIG. 1. The sampling provides two bits of data defining the current state (00, 01, 10, or 00 as shown in FIG. 1). These two bits of data are then combined with the known three bits of data (the prior directional bit, and the prior two state bits). As stated above, immediately after initialization, these three bits are "0" for direction and "00" for state, by default.

The logic proceeds to a block 40 and the five bits of data are then entered into the lookup table to determine a movement command. The movement command will be either no movement, a movement of +1, a movement of +2, a movement of −1, or a movement of −2 (see the Mouse Movement column of TABLE 1). The logic then proceeds to a block 50 in which the movement determined by the lookup table is executed i.e., the encoded signal produced by the mouse is output to the processor in the host computer for use in controlling the cursor or other object on the display. The logic advances to a block 60, and the default values of "0" and "00" for direction and current state are replaced using the current values. In a decision block 70, the logic determines if a stop command has been received. If so, the logic proceeds to a block 80, and the process is terminated. If no stop command has been received, the logic returns to block 30, and the cycle is repeated.

TABLE 1

| State number | Prior transition direction | Present state | Next state | Mouse Movement | Next transition direction |
|---|---|---|---|---|---|
| 1 | CCW | 00 | 00 | 0 | CCW |
| 2 | CCW | 00 | 01 | 0 | CW |
| 3 | CCW | 00 | 10 | +1 | CCW |
| 4 | CCW | 00 | 11 | +2 | CCW |
| 5 | CCW | 01 | 00 | +1 | CCW |
| 6 | CCW | 01 | 01 | 0 | CCW |
| 7 | CCW | 01 | 10 | +2 | CCW |

TABLE 1-continued

| State number | Prior transition direction | Present state | Next state | Mouse Movement | Next transition direction |
|---|---|---|---|---|---|
| 8 | CCW | 01 | 11 | 0 | CW |
| 9 | CCW | 10 | 00 | 0 | CW |
| 10 | CCW | 10 | 01 | +2 | CCW |
| 11 | CCW | 10 | 10 | 0 | CCW |
| 12 | CCW | 10 | 11 | +1 | CCW |
| 13 | CCW | 11 | 00 | +2 | CCW |
| 14 | CCW | 11 | 01 | +1 | CCW |
| 15 | CCW | 11 | 10 | 0 | CW |
| 16 | CCW | 11 | 11 | 0 | CCW |
| 17 | CW | 00 | 00 | 0 | CW |
| 18 | CW | 00 | 01 | −1 | CW |
| 19 | CW | 00 | 10 | 0 | CCW |
| 20 | CW | 00 | 11 | −2 | CW |
| 21 | CW | 01 | 00 | 0 | CCW |
| 22 | CW | 01 | 01 | 0 | CW |
| 23 | CW | 01 | 10 | −2 | CW |
| 24 | CW | 01 | 11 | −1 | CW |
| 25 | CW | 10 | 00 | −1 | CW |
| 26 | CW | 10 | 01 | −2 | CW |
| 27 | CW | 10 | 10 | 0 | CW |
| 28 | CW | 10 | 11 | 0 | CCW |
| 29 | CW | 11 | 00 | −2 | CW |
| 30 | CW | 11 | 01 | 0 | CCW |
| 31 | CW | 11 | 10 | −1 | CW |
| 32 | CW | 11 | 11 | 0 | CW |

While the utilization of the lookup table described above represents a preferred embodiment, it should be understood that the method of the present invention can be implemented in other ways. For instance, rather than using a lookup table, method can be implemented in a state machine. Such a state machine can be either software driven (controlled by machine instructions stored in a non-volatile memory) or hardware driven (controlled by a hard-wired logic circuit executing the sequence of logical steps described above). Finally, the method can be executed using combinational logic, in which all possible combinations are analyzed.

It should be noted that while such a combinational logic embodiment is technically possible, it is not expected to be a favorable embodiment, due to the relatively large number of possible combinations. As described above, the present invention employs 5 bits of information; one bit representing the current direction of movement, two bits representing the last state, and two bits representing current sample data. For five bits ($2^5$), there are a total of 64 possible combinations. Generally, combinational logic is employed in situations where fewer bits are utilized, and thus, fewer possible combinations need to be evaluated.

Figure 4A:
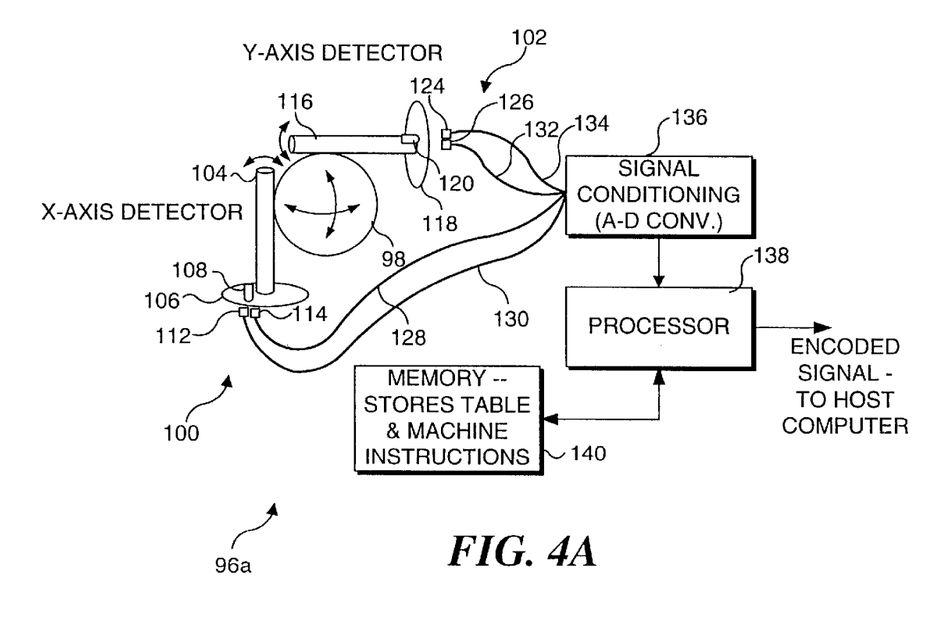
FIGS. 4A–C are schematic block diagrams of the X and Y axes detectors and other components in a mouse.

Mouse and Personal Computer System Suitable for Implementing the Present Invention FIG. 4A, a ball 98 rotates as a mouse 96 is moved over a surface by a axis detector 100 and a Y axis detector 102 are included in mouse 96/96' and respond to the rotational motion of ball 98 about the X and Y axes, respectively. X axis detector 100 includes a shaft 104 that is frictionally rotated by ball 98 as the ball rotates when moved along the X axis. Mounted on shaft 104 is a serrated disk 106 (serrations not shown). On one side of serrated disk 106 is an LED 108. Disposed on the opposite side of serrated shaft 106, opposite LED 108 are photo detectors 112 and 114. The photo detectors are disposed 90 degrees apart in phase relationship to the serrations in serrated disk 106 and receive the light from the LED that passes through the serrations of serrated disk 106, producing output signals indicative of rotational movement of ball 98 along the X axis. Similarly, a shaft 116 in Y axis detector 102 is frictionally driven by ball 98 as the ball rotates when mouse 96/96' is moved along the Y axis. Rotation of shaft 116 turns a serrated disk 118 that is mounted on the shaft, periodically interrupting and enabling light from an LED 120 reaching photo detectors 124 and 126, which are mounted about 90 degrees apart in phase relationship to the serrations in serrated disk 118 and are disposed on an opposite side of serrated disk 118 from LED 120.

Photo detectors 112 and 114 are respectively connected to a signal conditioning circuit 136 via leads 130 and 128. Likewise, photo detectors 124 and 126 are respectively connected to the signal conditioning circuit via leads 134 and 132. The signal conditioning circuit includes an analog-to-digital (A-D) converter (unless the processor includes an integral A-D converter). In one preferred embodiment (i.e., mouse 96), the signal conditioning circuit provides a digital input signal (i.e., a binary 1 or 0) to a processor 138. Processor 138 executes machine instructions stored in a memory 140, carrying out the logic described above in connection with the flow chart of FIG. 3 and uses the table discussed above, which is stored in memory 140, to produce an encoded signal indicative of movement of the mouse along the X axis and/or Y axis. The encoded signal is an accumulation of the mouse movement values determined from TABLE 1 for a predefined time interval, e.g., 0.01 seconds, and is supplied to a host personal computer or other computing device, as discussed below.

Figure 4B:
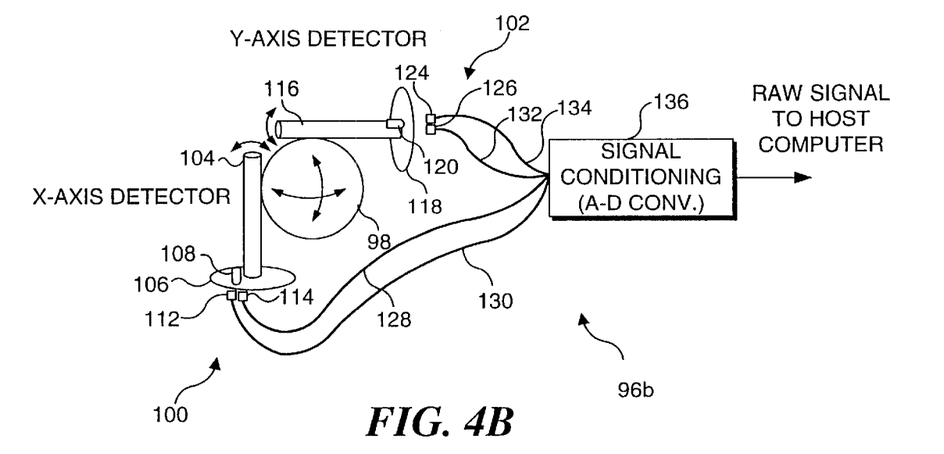

Alternatively, as in mouse 96b of FIG. 4B, the digital signal from signal conditioning circuit 136 is supplied directly to the host personal computer, which determines the relative movement of the mouse along the X axis and/or Y axis using the method discussed above, in connection with the logic of TABLE 1. In mouse 96b, processor 138 and memory 140 are omitted, since the logical processing steps are executed by the host personal computer.

Figure 4C:
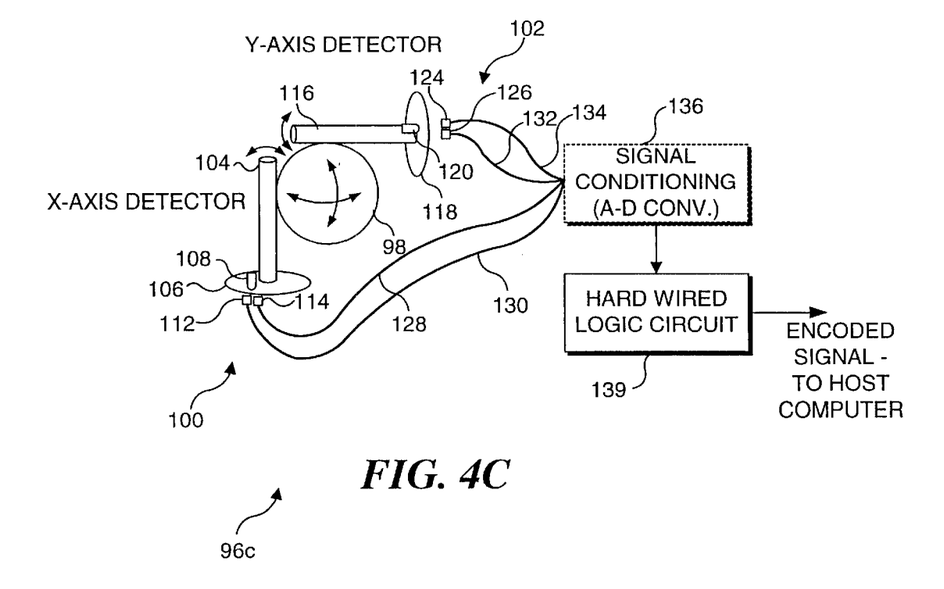

In yet another embodiment, a mouse 96c of FIG. 4C includes a hard-wired logic circuit 139, which replaces processor 138 and memory 140. As those of ordinary skill in the art will readily recognize, hard-wired logical circuits can be designed to perform the same functions as a software controlled processor based system. The sequence of logical steps described above with respect to FIG. 3 are the same, whether implemented in a hardware-based design (FIG. 4C), or a software-based design (FIGS. 4A and 4B). Hard-wired logic circuit 139 produces an encoded signal indicative of movement of the mouse along the X axis and/or Y axis. That encoded signal is equivalent to the encoded signal produced by processor 138 (utilizing machine instructions stored by memory 140), and hard-wired logic circuit 139 communicates that encoded signal to a host personal computer or other computing device. In a preferred embodiment, hard-wired logic circuit 139 is an application specific integrated circuit (ASIC), and signal conditioning circuit 136 is incorporated into the ASIC. Thus, in FIG. 4C, signal conditioning circuit 136 is shown as an optional element.

Figure 5:
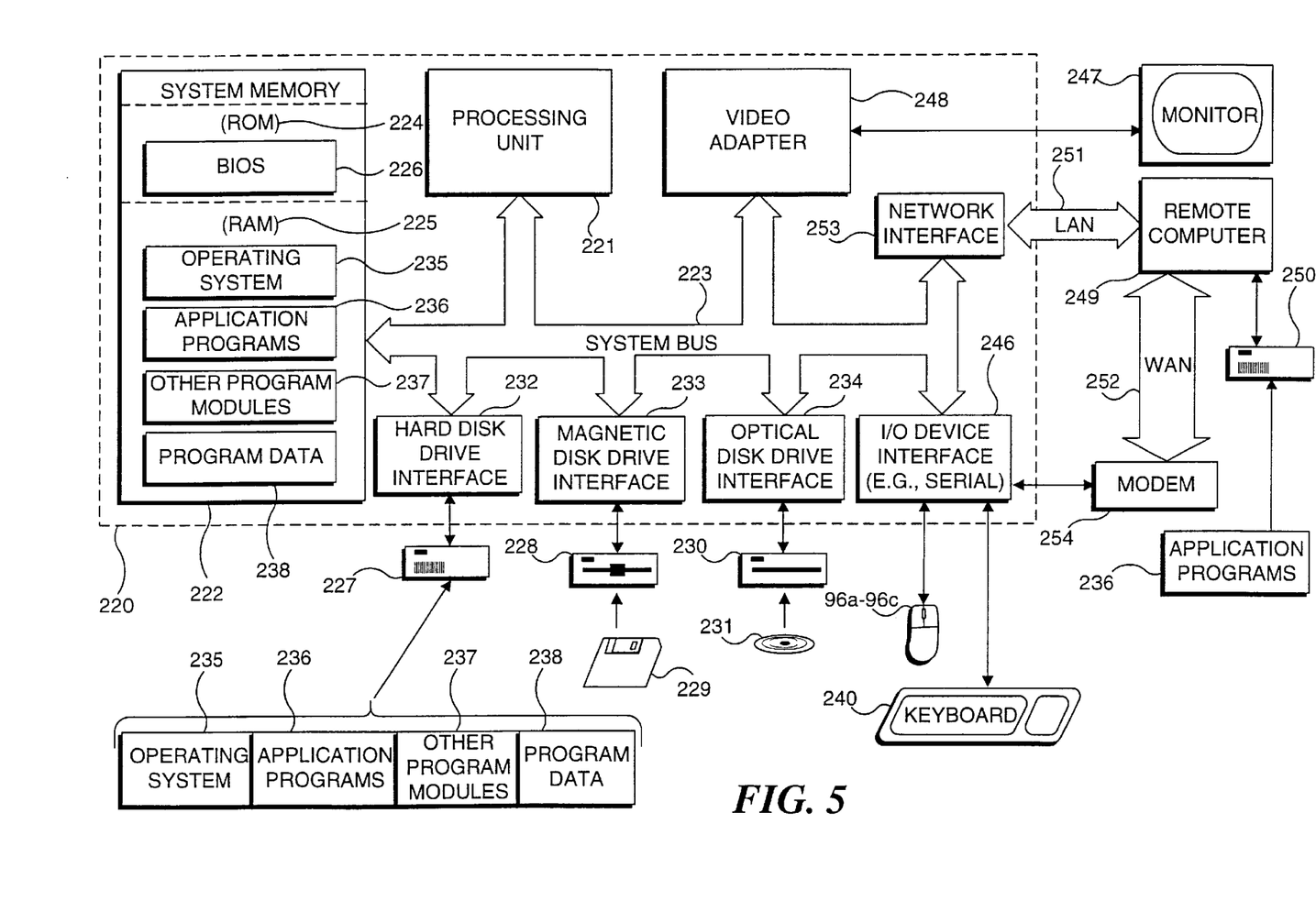
FIG. 5 is a schematic block diagram showing functional components of a host personal computer that is suitable for use in connection with the present invention.

FIG. 5 and the following discussion are intended to provide a brief, general description of a suitable computing environment for use with the present invention. Preferably, as described above, an encoded signal is produced by mouse 96a or 96c and input to a host personal computer 220, which decodes the encoded signal. The decoding of the encoded signal from the mouse is generally conventional, since the encoded signal comprises an accumulation of the mouse movement values determined from TABLE 1. All processing operations carried out by host personal computer 220 are best described in the general context of computer executable instructions, such as one or more program modules, that are executed by the host personal computer. Generally, program modules include routines, programs, objects, components, data structures, etc. that perform particular tasks or implement particular abstract data types. Moreover, those skilled in the art will appreciate that this invention may be practiced with other computer system configurations, including handheld devices, multiprocessor systems, microprocessor based or programmable consumer electronic devices, network personal computers, minicomputers, mainframe computers, and the like that are coupled to the host computer.

If mouse 96b is used instead of mouse 96a or 96c, the host computer directly receives the digital signals from signal conditioning circuit 136. In this case, machine instructions for interpreting the digital signals to provide mouse movement values for skipped states are executed by the host computer (instead of by processor 138 or hard-wired logic circuit 139). The present invention may also be practiced in distributed computing environments where such processing tasks are performed by remote processing devices that are linked through a communications network. In a distributed computing environment, one or more required program modules may be located in both local and remote memory storage devices.

With reference to FIG. 5, an exemplary system for use in implementing the invention includes a general purpose computing device in the form of conventional host personal computer 220, which is provided with a processing unit 221, a system memory 222, and a system bus 223. The system bus couples various system components, including the system memory, to processing unit 221 and may be any of several types of bus structures, including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that helps to transfer information between elements within host personal computer 220, such as during start up, is stored in ROM 224. If used with mouse 96b, the machine instructions for carrying out the logic shown in the flow chart of FIG. 3 and TABLE 1 would be loaded into RAM 225 for execution by processing unit 221, to implement the present invention. Host personal computer 220 further includes a hard disk drive 227 for reading from and writing to a hard disk, not shown, a magnetic disk drive 228 for reading from or writing to a removable magnetic disk 229, and an optical disk drive 230 for reading from or writing to a removable optical disk 231, such as a CD-ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. The drives and their associated computer readable media provide nonvolatile storage of computer readable machine instructions, data structures, program modules, and other data for personal computer 220. Although the exemplary environment described herein employs a hard disk, removable magnetic disk 229, and removable optical disk 231, it will be appreciated by those skilled in the art that other types of computer readable media, which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 229, optical disk 231, ROM 224 or RAM 225, including an operating system 235, one or more application programs 236, other program modules 237, and program data 238. A user enters commands and information and/or controls a cursor or other objects through input devices such as a keyboard 240 and mouse 96a, 96b, or 96c. Other input devices (not shown) may include a microphone, joystick, game pad, satellite dish, scanner, or the like. These and other input devices are often connected to processing unit 221 through an input/output (I/O) interface 246 that is coupled to the system bus. The term I/O interface is intended to encompass each interface specifically used for a serial port, a parallel port, a game port, a keyboard port, and/or a universal serial bus (USB). A monitor 247 or other type of display device is also connected to system bus 223 via an appropriate interface, such as a video adapter 248. In addition to the monitor, personal computers are often coupled to other peripheral output devices (not shown), such as speakers (through a sound card or other audio interface—not shown) and printers.

Host personal computer 220 may operate in a networked environment using logical connections to one or more remote computers, such as a remote computer 249. Remote computer 249 may be another personal computer, a server, a router, a network personal computer, a peer device, or other common network node, and typically includes many or all of the elements described above in connection with host personal computer 220, although only an external memory storage device 250 has been illustrated. The logical connections depicted include a local area network (LAN) 251 and a wide area network (WAN) 252. Such networking environments are common in offices, enterprise wide computer networks, intranets and the Internet.

When used in a LAN networking environment, host personal computer 220 is connected to LAN 251 through a network interface or adapter 253. When used in a WAN networking environment, host personal computer 220 typically includes a modem 254, or other means for establishing communications over WAN 252. Modem 254, which may be internal or external, is connected to the system bus 223, or coupled to the bus via I/O device interface 246, i.e., through a serial port. In a networked environment, program modules depicted relative to host personal computer 220, or portions thereof, may be stored in the remote memory storage device. These program modules include machine instructions, which when executed by processing unit 221, can cause the functions described above to be implemented in accord with the present invention, or more preferably, cause the encoded signal from the mouse to be properly decoded.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for detecting movement of a pointing device, comprising the steps of:
   (a) producing a pair of signals by monitoring rotation of a rotating element in the pointing device at two spaced-apart points, a phase relationship of said pair of signals changing state so as to indicate a speed and a direction at which the pointing device is moving relative to an axis;
   (b) sampling the state of the pair of signals, producing a plurality of samples; and (c) processing the plurality of samples to produce an output signal indicating the direction and the movement of the pointing device as a function of a change of the state of the pair of signals, said step of processing further including the steps of:
  (i) determining that a change in state has not been sampled and has thus been skipped; and
  (ii) upon determining that a state has been skipped, adjusting the output signal to include movement of the pointing device for the state that was skipped.

2. The method of claim 1, wherein the step of adjusting includes the step of assigning a direction for the movement of the pointing device for the change in state that was skipped, and wherein the direction that is assigned is identical to that just previously determined.

3. The method of claim 1, wherein the step of adjusting comprises the step of providing a value for the movement of the pointing device that is at least twice that determined for a change in state that has not been skipped.

4. The method of claim 1, wherein the step of processing includes the step of accessing a lookup table to determine a value for the movement of the pointing device that is used in the output signal.

5. The method of claim 1, wherein the step of processing includes the step of providing a hard-wired state machine that produces said output signal.

6. The method of claim 1, wherein the step of processing includes the step of providing one of a software driven state machine, a lookup table, and a combinational logic circuit to produce said output signal.

7. The method of claim 1, wherein the step of processing includes the step of accumulating values for movement of the pointing device for a predefined increment of time that extends over a plurality of samples, the output signal comprising an accumulation of the values for movement of the pointing device.

8. The method of claim 7, further comprising the step of providing the output signal to a host computer for use in controlling an object on a display.

9. The method of claim 1, further comprising the step of conveying the plurality of samples to a host computer that carries out the step of processing the plurality of samples.

10. The method of claim 1, wherein the step of determining that a state has not been sampled comprises the steps of:
  (a) defining an expected order of successive states; and
  (b) determining that the states that have been sampled are not in the expected order.

11. The method of claim 1, wherein a rate at which the plurality of states are sampled is sufficiently great to preclude a user from changing a direction of the movement of the pointing device relative to the axis between successive samples.

12. The method of claim 1, wherein a rate at which the plurality of states are sampled is sufficiently great to preclude a user from moving the pointing device relative to the axis during a time at which successive samples occur, so fast that more than one change of state is skipped.

13. The method of claim 1, further comprising the step of carrying out steps (a)–(c) to detect movement relative to an orthogonal axis.

14. For use with a pointing device in which a plurality of detectors produce signals that change state to indicate movement of the pointing device relative to each of two orthogonal axes, a method for detecting movement of the pointing device relative to each of the two orthogonal axes even when changes in state have been skipped, comprising the steps of:
  (a) monitoring changes in the state of the signals;
  (b) detecting when a change in the state of the signals has been skipped;
  (c) producing a movement value for the pointing device corresponding to the change in state of the signals; and
  (d) producing a compensating movement value for the pointing device corresponding to an expected change in state of the signals, when an actual change in state has not been monitored, but instead has been skipped, said movement value and said compensating movement value indicating movement of the pointing device relative to one of the two orthogonal axes.

15. The method of claim 14, wherein the step of producing the compensating movement values includes the step of assigning a direction to the compensating movement values identical to that of a movement value just determined.

16. The method of claim 14, wherein the compensating movement value is twice the movement value produced when a change in state has not been skipped.

17. The method of claim 14, wherein the steps of producing the movement value and producing the compensated movement value each comprise the step of accessing a lookup table.

18. The method of claim 14, further comprising the step of accumulating movement values and compensated movement values for each orthogonal axis, for a predefined interval, to produce an output signal.

19. The method of claim 18, further comprising the step of supplying the output signal from the pointing device to a host computer for use in controlling an object on a display in response to movement of the pointing device.

20. The method of claim 14, wherein the steps of producing the movement value and producing the compensated movement value are each executed by a host computer.

21. The method of claim 14, wherein the step of detecting when a change in the state of the signals has been skipped comprises the steps of:
  (a) defining an expected order in which the states being monitored should change; and
  (b) determining that the states being monitored have not changed in the expected order.

22. A computer-accessible memory media in which are stored computer-executable instructions for performing the steps recited in claim 14.

23. Apparatus for controlling an object on a display, comprising:
  (a) an element mounted so as to be movable by a user relative to each of two orthogonal axes;
  (b) a plurality of detectors positioned to sense movement of the element, said plurality of detectors producing a plurality of pairs of signals, each pair of signals having a phase relationship that defines changes in state indicative of the movement of the element relative to a different one of the two orthogonal axes;
  (c) a conditioning circuit coupled to the plurality of detectors to sample the plurality of pairs of signals, said conditioning circuit producing a digital signal corresponding to samples of the plurality of pairs of signals for each axis;
  (d) a memory in which machine instructions are stored; and
  (e) a processor coupled to the memory, and to the conditioning circuit to receive the digital signal, said processor executing the machine instructions to:
    (i) determine changes in the state of the plurality of pairs of signals;
    (ii) determine when a change of state has not been sampled and has been skipped; and (iii) produce movement values for the moving element, including movement values corresponding to changes in state that have been skipped when the plurality of pairs of signals were sampled.

24. The apparatus of claim 23, wherein the machine instructions cause the processor to determine a direction for the movement of the element based upon the changes in the state for each pair of signals.

25. The apparatus of claim 23, wherein the machine instructions cause the processor to assign the direction last determined, to a movement value for a change in state that was skipped.

26. The apparatus of claim 23, wherein the element, the plurality of detectors, the processor, the memory, and the conditioning circuit are disposed in a pointing device.

27. The apparatus of claim 23, wherein the element, the plurality of detectors, and the conditioning circuit are disposed in a pointing device, and wherein the processor and the memory are disposed within a host computer to which the pointing device is connected.

28. The apparatus of claim 23, wherein the conditioning circuit includes an analog-to-digital converter.

29. The apparatus of claim 23, wherein the memory stores a lookup table that defines movement values corresponding to changes in state for each pair of signals, said machine instructions causing the processor to access the lookup table when producing the movement values.

30. For use with a pointing device in which a plurality of detectors produce signals that change state to indicate movement of the pointing device relative to an axis, a method for detecting movement of the pointing device relative to said axis even when changes in state have been skipped, comprising the steps of:

(a) monitoring changes in a state of the signals;

(b) detecting when a change in a state of the signals has been skipped;

(c) producing a movement value for the pointing device corresponding to the change in state of the signals; and (d) producing a compensating movement value for the pointing device corresponding to an expected change in state of the signals, when an actual change in state has not been monitored, but instead has been skipped, said movement value and said compensating movement value indicating movement of the pointing device relative to said axis.

31. A method for detecting movement of a rotating element, comprising the steps of:

(a) producing a pair of signals by monitoring a rotation of said rotating element at two spaced-apart points, a phase relationship of said pair of signals changing state so as to indicate a direction in which the rotating element is moving relative to an axis;

(b) sampling the state of the pair of signals, producing a plurality of samples; and (c) processing the plurality of samples to produce an output signal indicating the direction and motion of the rotating element as a function of a change of the state of the pair of signals, said step of processing further including the steps of:

(i) determining that a change in state has not been sampled and has thus been skipped; and (ii) upon determining that a state has been skipped, adjusting the output signal to indicate a movement of the rotating element for the state that was skipped.

32. Apparatus for controlling an object on a display, comprising:

(a) an element mounted so as to be movable by a user relative to each of two orthogonal axes;

(b) a plurality of detectors positioned to sense movement of the element, said plurality of detectors producing a plurality of pairs of signals, each pair of signals having a phase relationship that defines changes in state indicative of the movement of the element relative to a different one of the two orthogonal axes;

(c) a conditioning circuit coupled to the plurality of detectors to sample the plurality of pairs of signals, said conditioning circuit producing a digital signal corresponding to samples of the plurality of pairs of signals for each axis; and (d) a logic circuit coupled to said conditioning circuit, so as to receive said digital signal corresponding to samples of the plurality of pairs of signals for each axis, said logic circuit being adapted to perform the following functions;

(i) determine changes in the state of the plurality of pairs of signals;

(ii) determine when a change of state has not been sampled and has been skipped; and (iii) produce movement values for the moving element, including movement values corresponding to changes in state that were skipped when the plurality of pairs of signals were sampled.

33. The apparatus of claim 32, wherein the logic circuit comprises an application specific integrated circuit.

34. The apparatus of claim 32 wherein said application specific integrated circuit performs the functions of both the conditioning circuit and the logic circuit.

35. The apparatus of claim 32 wherein the logic circuit is further adapted to determine a direction for the movement of the element based upon the changes in the state for each pair of signals.

36. The apparatus of claim 32 wherein the logic circuit is further adapted to assign the direction last determined to a movement value for a change in state that was skipped.

37. The apparatus of claim 32 wherein the element, the plurality of detectors, the logic circuit and the conditioning circuit are disposed in a pointing device.

38. The apparatus of claim 32 wherein the conditioning circuit includes an analog-to-digital converter.

* * * * *